United States Patent
Hajek et al.

(10) Patent No.: US 8,052,878 B2
(45) Date of Patent: Nov. 8, 2011

(54) FILTER ELEMENT WITH COATING FOR SURFACE FILTRATION

(75) Inventors: Stefan Hajek, Amberg (DE); Urs Herding, Ursensollen (DE); Kurt Palz, Crailsheim (DE); Wolfgang Raabe, Amberg (DE); Reiner Thuerauf, Amberg (DE); Bernd Meindl, Sulzbach-Rosenberg (DE)

(73) Assignee: Herding GmbH Filtertechnik, Amberg (DE)

( * ) Notice: Subject to any disclaimer, the term of this patent is extended or adjusted under 35 U.S.C. 154(b) by 0 days.

(21) Appl. No.: 12/405,731

(22) Filed: Mar. 17, 2009

(65) Prior Publication Data
US 2009/0200247 A1 Aug. 13, 2009

Related U.S. Application Data

(62) Division of application No. 11/182,078, filed on Jul. 15, 2005, now abandoned.

(30) Foreign Application Priority Data

Mar. 18, 2005 (DE) .......................... 10 2005 012 659

(51) Int. Cl.
*B01D 37/00* (2006.01)
*B01D 46/00* (2006.01)
*B01D 29/62* (2006.01)
*B01D 35/22* (2006.01)
*B01D 41/04* (2006.01)
*B01D 39/14* (2006.01)
*B01D 35/00* (2006.01)

(52) U.S. Cl. ............... 210/767; 210/791; 210/167.02; 210/108; 210/496; 210/504; 210/506; 210/510.1; 55/524; 96/290

(58) Field of Classification Search .................. None
See application file for complete search history.

(56) References Cited

U.S. PATENT DOCUMENTS
5,073,178 A * 12/1991 Mimori et al. .................. 55/523
(Continued)

FOREIGN PATENT DOCUMENTS
CA 2305719 4/1999
(Continued)

OTHER PUBLICATIONS
International Search Report dated Oct. 5, 2006.
(Continued)

*Primary Examiner* — Benjamin Kurtz
(74) *Attorney, Agent, or Firm* — Venable LLP; Robert Kinberg; Leigh D. Thelen

(57) ABSTRACT

A method for filtering out foreign particles from a cooling lubricant used in a process of machining a workpiece includes providing an inherently stable, flow-porous filter element. The filter element comprises a porous main body made of joined plastics particles and having an afflux surface and a porous coating on the afflux surface for surface filtration. The porous coating first component particles and/or fibres, second component anti-adhesion particles to mitigate the adhesion of filtered out material to the porous coating and to facilitate cleaning of the filter element, with the first component particles and/or fibres and the second component particles being mixed in the porous coating, a solidified inorganic binder, and a set adhesive. The solidified inorganic binder and the set adhesive bind the first component particles and/or fibres and the second component particles to each other and to the porous main body. The cooling lubricant is first passed through the porous coating and thereafter through the porous main body of the filter element.

25 Claims, 1 Drawing Sheet

U.S. PATENT DOCUMENTS

| | | | |
|---|---|---|---|
| 5,547,481 A * | 8/1996 | Herding et al. | 55/523 |
| 6,309,546 B1 | 10/2001 | Hermann et al. | |
| 6,675,654 B2 | 1/2004 | Hegner et al. | |
| 2003/0098276 A1 * | 5/2003 | Carlson | 210/497.1 |
| 2006/0088708 A1 | 4/2006 | Nakanishi et al. | |
| 2006/0096263 A1 * | 5/2006 | Kahlbaugh et al. | 55/527 |

FOREIGN PATENT DOCUMENTS

| | | |
|---|---|---|
| DE | 116 557 | 12/1975 |
| DE | 3807748 A1 | 9/1989 |
| DE | 101 22 511 A1 | 5/2001 |
| EP | 1 402 933 A1 | 3/2004 |
| GB | 2 215 326 A | 9/1989 |
| WO | WO 99/18282 | 4/1999 |
| WO | WO-2005/005015 | 1/2005 |
| WO | WO-2005/053818 | 6/2005 |

OTHER PUBLICATIONS

International Preliminary Report on Patentability dated Oct. 11, 2007 with an English Translation.

* cited by examiner

FILTER ELEMENT WITH COATING FOR SURFACE FILTRATION

CROSS-REFERENCE TO RELATED APPLICATIONS

This application is a divisional application of U.S. application Ser. No. 11/182,078, filed Jul. 15, 2005, claiming priority from German Application DE 10 2005 012 659.6, filed Mar. 18, 2005, the contents of both applications being incorporated herein by reference.

BACKGROUND OF THE INVENTION

The invention relates to an inherently stable, flow-porous filter element having a porous coating for surface filtration on its afflux surface.

Such filter elements are known with a number of coatings of different construction.

SUMMARY

It is an object of the invention to make available a filter element with a surface filtration coating that is useful also for increased temperatures and/or increased resistance to chemical attack.

To meet this object, the coating of the filter element comprises:

(a) a main component of particles and/or fibers;

(b) an inorganic binder component binding the particles and/or fibers of the main component to each other;

(c) an adhesive binding the porous coating to the remainder of the filter element;

(d) and an anti-adhesion component mitigating the adhesion of filtered out material to the porous coating and facilitating cleaning of the filter element.

The binding of the coating to the remainder of the filter element need not be effected exclusively by the adhesive, but the adhesive has a considerable share in effecting this binding. On the other hand, the adhesive may participate in addition also in binding the particles and/or fibers of the main component to each other.

Preferred particles for the main component are kieselguhr particles, zeolite particles, polyvinyl pyrrolidone particles and mixtures thereof; among these, kieselguhr particles are particularly preferred. Preferred fibers for the main component are ceramic fibers. The preferred substances mentioned do not have to form 100% of the main component; it is sufficient when the main component contains one or more of the substances referred to as preferred ones to a considerable share. On the other hand, it is preferred that the main component consists in essence of only one of the preferred substances mentioned or mixtures thereof. As an alternative, however, it is preferred as well to use a mixture of ceramic fibers and one type of particles referred to as preferred or several types of particles referred to as preferred.

The binder component may comprise or consist of water glass. However, it is preferred that the binder component is not water glass. The binder component preferably is sol-based. The binder component preferably comprises crosslinked $SiO_2$ or crosslinked $SiO_2$ derivative or crosslinked $TiO_2$ or crosslinked $TiO_2$ derivative or crosslinked $ZrO_2$ or crosslinked $ZrO_2$ derivative or a mixture of several of the afore-mentioned substances, Crosslinked $SiO_2$ is very much preferred. Also as regards the binder component, it is not necessary for the same to consist to 100% of one of the substances referred to as preferred or of a mixture of several of these substances. However, it is preferred that the binder component consists in essence of one of the substances referred to as preferred or of a mixture of several of these substances. $SiO_2$ derivative is understood to be a substance which, apart from the silicon atoms and the oxygen atoms, still contains some organic material. The same holds analogously for $TiO_2$ and $ZrO_2$.

Preferably, the adhesive is an organic dispersion adhesive. Aqueous dispersions are particularly preferred.

Preferably, the anti-adhesion component is polytetrafluoroethylene—in the following briefly referred to as PTFE—and/or silicone. Very much preferred is PTFE. Moreover, the case very much preferred is that the anti-adhesion component in essence consists of PTFE only. A particularly expedient embodiment of the invention provides for the application of the coating pursuant to the sol-gel process.

A further expedient embodiment of the invention consists in that the coating (in essence) contains kieselguhr (only) as main component and (in essence) PTFE (only) as anti-adhesion component in a weight ratio of 1:1 to 1;2.

The main body of the filter element, i.e. the basic structure of the filter element located underneath the coating, preferably is composed of sintered plastics particles. Polyethylene particles are particularly favorable.

The modification of the filter element according to the invention in which particles are present as main component of the coating, can be used in particularly favorable manner for liquid filtration or for separating oil mists from a gas stream. The filtration of cooling lubricant is envisaged in particular in this regard; cooling lubricants are oily liquids or emulsions of lubricating substances in particular in water that are used in mechanical or abrasive or cutting or other material-removing (e.g. spark erosion) working (machining) of workpieces. The cooling lubricant as a rule is pumped in circulating manner and contains, when leaving the place of workpiece machining, abraded, cut or removed particles of the machined workpiece. These particles need to be filtered out before the cooling lubricant again reaches the workpiece in the circulation. Preferably, the filtration is performed by means of the filter element according to the invention which is simply immersed into a bath of the cooling lubricant. The filtered out foreign particles adhere to the coating on the outer surface of the filter element the filtered cooling lubricant is sucked off from inside of the filter element. For periodic cleaning of the filter element, the pump circulation is briefly interrupted at suitable intervals in time and replaced by a brief liquid stream of cleaned cooling lubricant in the opposite direction, so that the filtered out foreign particles accumulated on the outside of the coating drop down into the cooling lubricant bath and may be removed from there e.g. by means of a sludge discharge means.

On the basis of the teaching of the invention it is possible to produce filter elements which in essence completely filter out foreign particles of a size of more than 5 .mu.m, more preferably more than 3 .mu.m, from a liquid. In case of cooling lubricant, the effect achieved is that the machining accuracy of the workpiece is very high as there is extremely clean cooling lubricant flowing to the machining site. It is possible to produce filter elements according to the invention for gas filtration which filter out foreign particles of a size of more than 3 .mu.m, more preferably of a size of more than 1 mu.m, in essence completely.

The variant of the filter element according to the invention in which fibers are present as main component of the coating (to a by far predominant extent or in essence as sole component) can be used in particularly expedient manner for gas filtration.

All in all, the filter element according to the invention can be used in particularly advantageous manner in situations in which resistance to increased temperatures and/or resistance to chemical attack is important. The filter element may be designed to resist a temperature of permanent use of up to 180.degree. C., or it may be designed to resist a temperature of permanent use of up to 150.degree. C., or it may be designed to resist a temperature of permanent use of up to 120.degree. C. Chemical attack occurs e.g. in case of the afore-mentioned cooling lubricant. Another application involving chemical attack is the filtering of combustion exhaust gas. As examples for applications involving temperature resistance, there can be named the filtering of combustion exhaust gas, filtering for product separation from a gas stream (e.g. spray drier, drier in foodstuff industry) and materials recycling from a gas stream (e.g. catalyst in fluidized bed reactors)

BRIEF DESCRIPTION OF THE DRAWINGS

The invention and preferred developments of the invention will be explained in more detail in the following by way of embodiments.

DETAILED DESCIPTION

Figure 1:
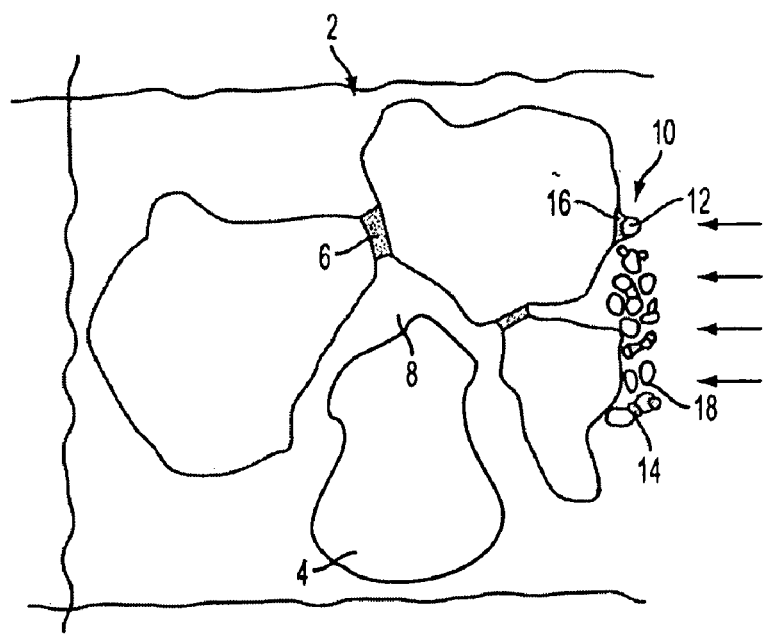
FIG. 1 shows a sectional view of a fragment of a filter element.

In the filter element 2 shown as a fragment in FIG. 1, the main component consists of polyethylene particles 4 that are sintered together at their contact locations 6. The pores 8 between the particles 4 have an average size of e.g. 10 to 60 .mu.m.

The coating 10 of the filter element in essence consists of kieselguhr particles 12 that are bonded to each other via crosslinked SiO.sub.2 14 and, at their contact locations with polyethylene particles 4, are bonded to the main body by means of an organic dispersion adhesive 16, and of PTFE particles 18. The kieselguhr particles 12 are so small that the pores between them in the average have a size of less than 3 .mu.m. In producing the filter element 2 of FIG. 1, the main body is produced first and thereafter the coating is applied to the afflux surface of the same either with the consistence of a rather thin liquid or with the consistence of a rather thick liquid to a pasty consistence, e.g. by spraying, rolling on, brush application, etc. The coating mass to be applied in essence consists of kieselguhr particles, an SiO.sub.2 sol, PTFE particles, organic dispersion adhesive, water and a small amount of tenside, wetting aid or foam prevention means. All of these components are available on the market without any problem. The coating mass is emulsion-stable. Upon application of the coating mass, there is a sol-gel reaction, using as a rule a slightly increased temperature, and after evaporation of all water, the coating is formed in the solid aggregate state. During the sol-gel reaction and evaporation of the water, crosslinking of the SiO.sub.2 phase and thus binding of the kieselguhr particles to each other takes place.

The weight ratio of kieselguhr to PTFE is in the range from 1:1 to 1:2 for obtaining particularly good results.

Figure 2:
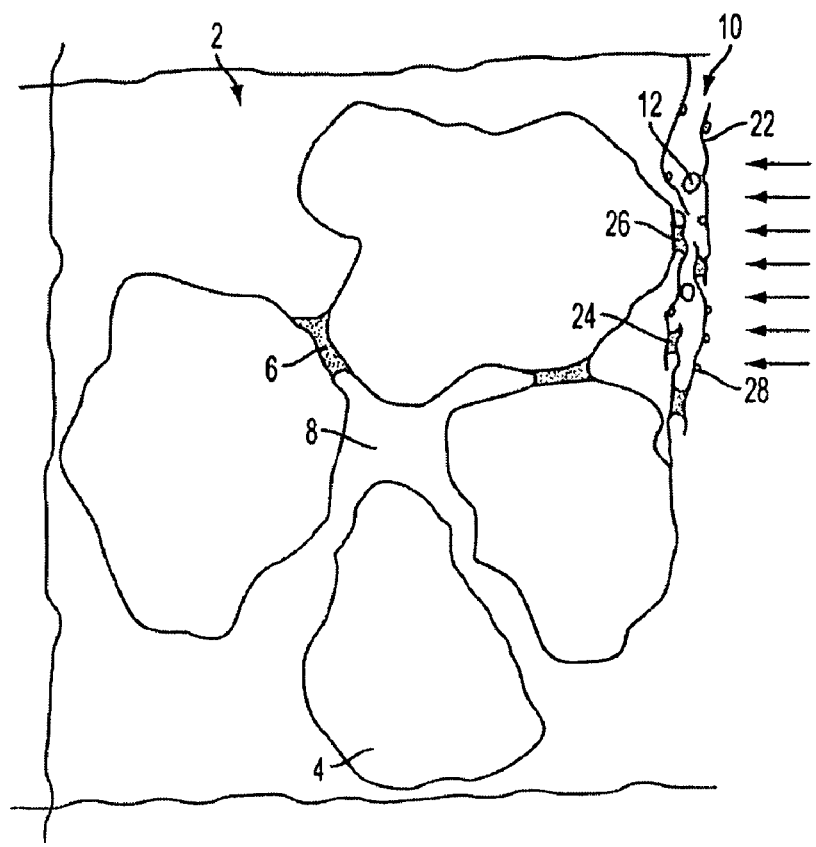
FIG. 2 shows a sectional view of a fragment of a filter element according to a another embodiment.

The filter element 2 shown in a fragment in FIG. 2 differs from the filter element according to FIG. 1 by a different coating 10. In this case, the finished coating 10 in essence consists of ceramic fibers 22, crosslinked SiO.sub.2 24, organic dispersion adhesive 26 and PTFE particles 28. Kieselguhr particles 12 in a smaller amount than in FIG. 1 are present as well. As regards the coating mass in the state to be applied, the statements (additional components, consistence etc.) made in connection with the embodiment according to FIG. 1 are applicable again.

The pores between the ceramic fibers 22 have substantially the same size as the pores between the kieselguhr particles 12 in the embodiment according to FIG. 1. The ceramic fibers 22 typically have a diameter of a few .mu.m and a length of 10 to 30 .mu.m; chemically, they consist typically in essence of SiO.sub.2/Al.sub.2O.sub.3.

Kieselguhr is a common designation for a material consisting typically to 70 to 90 of amorphous silicic acid and to 3 to 12% of water.

In case of silicone as anti-adhesion component, the drawing figures would have a substantially unchanged appearance. In case of water glass as inorganic binder component, the drawing figures would have a substantially unchanged appearance.

What is claimed is:

1. A method for filtering out foreign particles from a cooling lubricant used in a process of machining a workpiece, the method comprising:
    providing an inherently stable, flow-porous filter element which comprises:
        a porous main body made of joined plastics particles and having an afflux surface; and
        a porous coating on the afflux surface for surface filtration comprising a composite including:
            first component particles and/or fibres,
            second component anti-adhesion particles to mitigate the adhesion of filtered out material to the porous coating and to facilitate cleaning of the filter element, with the first component particles and/or fibres and the second component particles being mixed in the porous coating,
            a solidified inorganic binder, and
            a set adhesive, wherein the solidified inorganic binder and the set adhesive bind the first component particles and/or fibres and the second component particles to each other and to the porous main body; and
    passing the flow of cooling lubricant first through the porous coating and thereafter through the porous main body of the filter element.

2. The method of claim 1, comprising selecting a material for the first component particles from the group consisting of kieselguhr particles, zeolite particles, polyvinyl pyrrolidone particles, and mixtures thereof.

3. The method of claim 2, comprising utilizing at least kieselguhr particles as the first component particles.

4. The method of claim 1, comprising utilizing at least ceramic fibres as the first component fibres.

5. The method of claim 1, comprising selecting a material for the solidified binder from the group consisting of crosslinked $SiO_2$, crosslinked $SiO_2$ derivative, crosslinked $TiO_2$, crosslinked $TiO_2$ derivative, crosslinked $ZrO_2$, crosslinked $ZrO_2$ derivative, and mixtures thereof.

6. The method of claim 5, comprising utilizing at least the crosslinked $SiO_2$ as the solidified binder.

7. The method of claim 1, comprising utilizing at least a set organic dispersion adhesive in the set adhesive.

8. The method of claim 1, comprising utilizing at least polytetrafluorothylene (PTFE) particles and/or silicone particles as the second component anti-adhesion particles.

9. The method of claim 3, comprising providing the coating composite with kieselguhr particles and PTFE particles in a weight ratio of approximately 1:1 to 1:2.

10. The method of claim 1, further including filtering out substantially all foreign particles having a size of more than 5 microns.

11. A method for separating oil mist from a gas stream, the method comprising:
providing an inherently stable, flow-porous filter element which comprises:
a porous main body made of joined plastics particles and having an afflux surface; and
a porous coating on the afflux surface for surface filtration comprising a composite including:
first component particles and/or fibres,
second component anti-adhesion particles to mitigate the adhesion of filtered out material to the porous coating and to facilitate cleaning of the filter element, with the first component particles and/or fibres and the second component particles being mixed in the porous coating,
a solidified inorganic binder, and
a set adhesive, wherein the solidified inorganic binder and the set adhesive bind the first component particles and/or fibres and the second component particles to each other and to the porous main body; and
passing the gas stream first through the porous coating and thereafter through the porous main body of the filter element.

12. The method of claim 11, comprising selecting a material for the first component particles from the group consisting of kieselguhr particles, zeolite particles, polyvinyl pyrrolidone particles, and mixtures thereof.

13. The method of claim 12, comprising utilizing at least kieselguhr particles as the first component particles.

14. The method of claim 11, comprising utilizing at least ceramic fibres as the first component fibres.

15. The method of claim 11, comprising selecting a material for the solidified binder from the group consisting of crosslinked $SiO_2$, crosslinked $SiO_2$ derivative, crosslinked $TiO_2$, crosslinked $TiO_2$ derivative, crosslinked $ZrO_2$, crosslinked $ZrO_2$ derivative, and mixtures thereof.

16. The method of claim 15, comprising utilizing at least the crosslinked $SiO_2$ as the solidified binder.

17. The method of claim 11, comprising utilizing at least a set organic dispersion adhesive in the set adhesive.

18. The method of claim 11, comprising utilizing at least polytetrafluorothylene (PTFE) particles and/or silicone particles as the second component anti-adhesion particles.

19. The method of claim 13, comprising providing the coating composite with kieselguhr particles and PTFE particles in a weight ratio of approximately 1:1 to 1:2.

20. The method of claim 1, further comprising utilizing an emulsion-stable coating mass applied to the afflux surface of the porous main body.

21. The method of claim 1, further comprising periodically cleaning the filter element by passing a brief stream of clean cooling lubricant first through the porous main body and thereafter through the porous coating.

22. The method of claim 1, further comprising:
utilizing an emulsion-stable coating mass applied to the afflux surface of the porous main body; and
periodically cleaning the filter element by passing a brief stream of clean cooling lubricant first through the porous main body and thereafter through the porous coating.

23. The method of claim 11, further comprising utilizing an emulsion-stable coating mass applied to the afflux surface of the porous main body.

24. The method of claim 11, further comprising periodically cleaning the filter element by passing a brief stream of clean gas first through the porous main body and thereafter through the porous coating.

25. The method of claim 11, further comprising:
utilizing an emulsion-stable coating mass applied to the afflux surface of the porous main body, and
periodically cleaning the filter element by passing a brief stream of clean gas first through the porous main body and thereafter through the porous coating.

* * * * *